US011695540B2

(12) United States Patent
Lee et al.

(10) Patent No.: US 11,695,540 B2
(45) Date of Patent: Jul. 4, 2023

(54) ELECTRONIC APPARATUS, CONTROL METHOD THEREOF AND SERVER

(71) Applicants: SEOUL NATIONAL UNIVERSITY R&DB FOUNDATION, Seoul (KR); INDUSTRY-ACADEMIC COOPERATION FOUNDATION, CHOSUN UNIVERSITY, Gwangju (KR)

(72) Inventors: Eunsang Lee, Seoul (KR); Joon-Woo Lee, Seoul (KR); Jong-Seon No, Seoul (KR); Young-Sik Kim, Gwangju (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/367,252

(22) Filed: Jul. 2, 2021

(65) Prior Publication Data

US 2022/0150047 A1 May 12, 2022

(30) Foreign Application Priority Data

Nov. 10, 2020 (KR) .......................... 10-2020-0149677

(51) Int. Cl.
*H04L 9/00* (2022.01)
*H04L 9/30* (2006.01)

(52) U.S. Cl.
CPC .................................. *H04L 9/008* (2013.01)

(58) Field of Classification Search
CPC .... H04L 2209/12; H04L 9/008; H04L 9/3093
See application file for complete search history.

(56) References Cited

U.S. PATENT DOCUMENTS

| 11,239,995 B2* | 2/2022 | Cheon | H04L 9/3093 |
|---|---|---|---|
| 2020/0036510 A1* | 1/2020 | Gomez | G06N 3/045 |
| 2020/0136798 A1 | 4/2020 | Kim et al. | |
| 2022/0029782 A1* | 1/2022 | Cheon | H04L 9/008 |

FOREIGN PATENT DOCUMENTS

| KR | 20200047002 A | 5/2020 |
|---|---|---|
| KR | 20200070090 A | 6/2020 |

OTHER PUBLICATIONS

Minimax Approximation and Remez Algorithm, by Sherif A. Tawfik, published Jul. 24, 2005 (Year: 2005).*
Numerical Method for Comparison on Homomorphically Encrypted Numbers by Cheon et al., published 2019 (Year: 2019).*
(Continued)

*Primary Examiner* — Vu V Tran
(74) *Attorney, Agent, or Firm* — Steinfl + Bruno LLP

(57) ABSTRACT

Disclosed is an electronic apparatus. The electronic apparatus includes a memory storing a composite function in which at least two polynomials are composed and a processor configured to, based on a comparison operation command being received for a plurality of homomorphic ciphertexts, perform operation by reflecting the plurality of homomorphic ciphertexts to the composite function, and obtain a comparison result of the plurality of homomorphic ciphertexts based on the operation result, each of the at least two polynomials may output a value in a preset range for a value in a preset domain, and a domain of one of the at least two polynomials may be determined based on a range of a previous polynomial.

12 Claims, 18 Drawing Sheets

(56) References Cited

OTHER PUBLICATIONS

Cheon, H.J., et al., "Efficient Homomorphic Comparison Methods with Optimal Complexity," Advances in Cryptology—ASIACRYPT2020. Lecture Notes in Computer Science, vol. 12492. Springer, Cham. Jan. 2019. 33 Pages. https://doi.org/10.1007/978-3-030-64834-3_8.

Lee, E., et al., "Minimax Approximation of Sign Function by Composite Polynomial for Homomorphic Comparison," Seoul National University, Republic of Korea in association with Chosun University, Republic of Korea. Jul. 7, 2020. 30 Pages.

Lee, E., "Improvement of Frodo KEM System by BCH Codes and Minimax Approximation of Sign Function by Composite Polynomial for Homomorphic Comparison," Ph.D. Dissertation submitted to the Department of Electrical Engineering and Computer Science, College of Engineering, Seoul National University. Aug. 1, 2020. 111 Pages.

* cited by examiner

FIG. 5

| polynomial degree d | dep(d) | mult(d) |
|---|---|---|
| 3 | 2 | 2 |
| 5 | 3 | 3 |
| 7 | 3 | 4 |
| 9 | 4 | 4 |
| 11 | 4 | 5 |
| 13 | 4 | 6 |
| 15 | 4 | 7 |
| 17 | 5 | 7 |
| 19 | 5 | 8 |
| 21 | 5 | 8 |
| 23 | 5 | 8 |
| 25 | 5 | 10 |
| 27 | 5 | 10 |
| 29 | 5 | 10 |
| 31 | 5 | 10 |

FIG. 6

Input: $t, m_{max}, n_{max}$

Output: $f(m, n, t), G(m, n, t)$ for $0 \leq m \leq m_{max}$ and $0 \leq n \leq n_{max}$ 1. Generate 2-dimensional table $G(m, n, t)$ for $0 \leq m \leq m_{max}$ and $0 \leq n \leq n_{max}$, where the components are all empty sets.
2. for $m \leftarrow 0$ to $m_{max}$ do
3.     for $n \leftarrow 0$ to $n_{max}$ do
4.         if $m \leq 1$ or $n \leq 1$ then
5.             $f(m, n, t) \leftarrow t$
6.         else
7.             $j \leftarrow \underset{\substack{1 \leq k \\ mult(2k+1) \leq m \\ dep(2k+1) \leq n}}{\operatorname{argmax}} \mathit{InvMinErr}(2k+1, f(m - mult(2k+1), n - dep(2k+1), t))$
8.             $f(m, n, t) \leftarrow \mathit{InvMinErr}(2j+1, f(m - mult(2j+1), n - dep(2j+1), t))$
9.             $G(m, n, t) \leftarrow \{2j+1\} \cup G(m - mult(2j+1), n - dep(2j+1), t)$
10.         end
11.     end
12. end

FIG. 7A

Input: $\alpha, \epsilon, m_{max}, n_{max}, f(m, n, 2^{1-\alpha}), G(m, n, 2^{1-\alpha})$ for
$0 \leq m \leq m_{max}, 0 \leq n \leq n_{max}$ Output: $minmult, mindep, mindegs$ 1  for $i \leftarrow 0$ to $m_{max}$ do
2      if $f(i, n_{max}, 2^{1-\alpha}) \geq \frac{1-\epsilon}{1+\epsilon}$ then
3          $minmult \leftarrow i$
4          Go to line 7
5      end
6  end
7  for $j \leftarrow 0$ to $n_{max}$ do
8      if $f(minmult, j, 2^{1-\alpha}) \geq \frac{1-\epsilon}{1+\epsilon}$ then
9          $mindep \leftarrow j$
10         Go to line 13
11     end
12 end
13 $mindegs \leftarrow G(minmult, mindep, 2^{1-\alpha})$          // $mindegs$: ordered set

FIG. 7B

Input: $\alpha, \epsilon, m_{max}, n_{max}, f(m, n, 2^{1-\alpha}), G(m, n, 2^{1-\alpha})$ for
$0 \leq m \leq m_{max}, 0 \leq n \leq n_{max}$
Output: $minmult, mindep, mindegs$ 1 for $i \leftarrow 0$ to $n_{max}$ do
2    if $f(m_{max}, i, 2^{1-\alpha}) \geq \frac{1-\epsilon}{1+\epsilon}$ then
3       $mindep \leftarrow i$
4       Go to line 7
5    end
6 end
7 for $j \leftarrow 0$ to $m_{max}$ do
8    if $f(j, mindep, 2^{1-\alpha}) \geq \frac{1-\epsilon}{1+\epsilon}$ then
9       $minmult \leftarrow j$
10      Go to line 13
11    end
12 end
13 $mindegs \leftarrow G(minmult, mindep, 2^{1-\alpha})$     // mindegs: ordered set

FIG. 8A

| α | number of non-scalar multiplications | | depth consumption | |
|---|---|---|---|---|
|   | the previous algorithm | the proposed algorithm | the previous algorithm | the proposed algorithm |
| 5  | 16 | 8  | 16 | 8  |
| 6  | 16 | 11 | 16 | 10 |
| 7  | 24 | 12 | 24 | 12 |
| 8  | 24 | 14 | 24 | 14 |
| 9  | 24 | 16 | 24 | 15 |
| 10 | 28 | 18 | 28 | 16 |
| 11 | 28 | 19 | 28 | 19 |
| 12 | 32 | 20 | 32 | 20 |
| 13 | 32 | 22 | 32 | 22 |
| 14 | 32 | 24 | 32 | 23 |
| 15 | 36 | 25 | 36 | 25 |
| 16 | 36 | 27 | 36 | 26 |
| 17 | 40 | 28 | 40 | 28 |
| 18 | 40 | 30 | 40 | 29 |
| 19 | 40 | 31 | 40 | 31 |
| 20 | 44 | 33 | 44 | 32 |

FIG. 8B

| $\alpha$ | number of non-scalar multiplications | | depth consumption | |
|---|---|---|---|---|
| | the previous algorithm | the proposed algorithm | the previous algorithm | the proposed algorithm |
| 5 | 16 | 10 | 16 | 7 |
| 6 | 16 | 14 | 16 | 8 |
| 7 | 24 | 14 | 24 | 10 |
| 8 | 24 | 18 | 24 | 11 |
| 9 | 24 | 18 | 24 | 13 |
| 10 | 28 | 21 | 28 | 14 |
| 11 | 28 | 25 | 28 | 15 |
| 12 | 32 | 28 | 32 | 16 |
| 13 | 32 | 31 | 32 | 17 |
| 14 | 32 | 31 | 32 | 19 |
| 15 | 36 | 34 | 36 | 20 |
| 16 | 36 | 37 | 36 | 21 |
| 17 | 40 | 40 | 40 | 22 |
| 18 | 40 | 43 | 40 | 23 |
| 19 | 40 | 47 | 40 | 24 |
| 20 | 44 | 50 | 44 | 25 |

FIG. 9

| α | mindegs | |
|---|---|---|
| | DynMinMult | DynMinDep |
| 5 | {9,9} | {7,13} |
| 6 | {5,7,9} | {15,15} |
| 7 | {9,9,9} | {7,7,13} |
| 8 | {3,9,9,9} | {7,15,15} |
| 9 | {7,9,9,9} | {7,7,7,13} |
| 10 | {3,7,7,9,9} | {7,7,13,15} |
| 11 | {5,9,9,9,9} | {7,7,15,31} |
| 12 | {9,9,9,9,9} | {7,15,15,31} |
| 13 | {3,9,9,9,9,9} | {15,15,15,31} |
| 14 | {7,9,9,9,9,9} | {7,7,13,15,31} |
| 15 | {3,5,9,9,9,9,9} | {13,7,15,15,31} |
| 16 | {5,7,9,9,9,9,9} | {13,15,15,15,31} |
| 17 | {9,9,9,9,9,9,9} | {13,15,15,31,31} |
| 18 | {7,3,9,9,9,9,9,9} | {13,15,31,31,31} |
| 19 | {5,9,9,9,9,9,9,9} | {15,31,31,31,31} |
| 20 | {9,9,9,9,9,9,9,11} | {31,31,31,31,31} |

FIG. 11

| Name | Plot | Equation | Derivative |
|---|---|---|---|
| Identity | | $f(x) = x$ | $f'(x) = 1$ |
| Binary step | | $f(x) = \begin{cases} 0 \text{ for } x < 0 \\ 1 \text{ for } x \geq 0 \end{cases}$ | $f'(x) = \begin{cases} 0 \text{ for } x \neq 0 \\ ? \text{ for } x = 0 \end{cases}$ |
| Logistic (a.k.a Soft step) | | $f(x) = \frac{1}{1+e^{-x}}$ | $f'(x) = f(x)(1-f(x))$ |
| TanH | | $f(x) = \tanh(x) = \frac{2}{1+e^{-2x}} - 1$ | $f'(x) = 1 - f(x)^2$ |
| ArcTan | | $f(x) = \tan^{-1}(x)$ | $f'(x) = \frac{1}{x^2+1}$ |
| Rectified Linear Unit (ReLU) | | $f(x) = \begin{cases} 0 \text{ for } x < 0 \\ x \text{ for } x \geq 0 \end{cases}$ | $f'(x) = \begin{cases} 0 \text{ for } x < 0 \\ 1 \text{ for } x \geq 0 \end{cases}$ |
| Parameteric Rectified Linear Unit (PReLU) | | $f(x) = \begin{cases} \alpha x \text{ for } x < 0 \\ x \text{ for } x \geq 0 \end{cases}$ | $f'(x) = \begin{cases} \alpha \text{ for } x < 0 \\ 1 \text{ for } x \geq 0 \end{cases}$ |
| Exponential Linear Unit (ELU) | | $f(x) = \begin{cases} \alpha(e^x - 1) \text{ for } x < 0 \\ x \text{ for } x \geq 0 \end{cases}$ | $f'(x) = \begin{cases} f(x) + \alpha \text{ for } x < 0 \\ 1 \text{ for } x \geq 0 \end{cases}$ |
| SoftPlus | | $f(x) = \log_e(1+e^x)$ | $f'(x) = \frac{1}{1+e^{-x}}$ |

FIG. 12

| Activation function | Equation | Example | 1D Graph |
|---|---|---|---|
| Unit step (Heaviside) | $\phi(z) = \begin{cases} 0, & z < 0, \\ 0.5, & z = 0, \\ 1, & z > 0, \end{cases}$ | Perceptron variant | |
| Sign (Signum) | $\phi(z) = \begin{cases} -1, & z < 0, \\ 0, & z = 0, \\ 1, & z > 0, \end{cases}$ | Perceptron variant | |
| Linear | $\phi(z) = z$ | Adaline, linear regression | |
| Piece-wise linear | $\phi(z) = \begin{cases} 1, & z \geq \frac{1}{2}, \\ z + \frac{1}{2}, & -\frac{1}{2} < z < \frac{1}{2}, \\ 0, & z \leq -\frac{1}{2}, \end{cases}$ | Support vector machine | |
| Logistic (sigmoid) | $\phi(z) = \dfrac{1}{1 + e^{-z}}$ | Logistic regression, Multi-layer NN | |
| Hyperbolic tangent | $\phi(z) = \dfrac{e^z - e^{-z}}{e^z + e^{-z}}$ | Multi-layer Neural Networks | |
| Rectifier, ReLU (Rectified Linear Unit) | $\phi(z) = max(0, z)$ | Multi-layer Neural Networks | |
| Rectifier, softplus | $\phi(z) = \ln(1 + e^z)$ | Multi-layer Neural Networks | |

Copyright © Sebastian Raschka 2016
(http://sebastianraschka.com)

FIG. 13

Algorithm 7: MinimaxComp (using margin)

Input: Inputs $u, v \in (0, 1)$, precision parameters $\alpha$ and $\epsilon$, depth consumption $D$, and margin $\eta$

Output: Approximate value of $\text{comp}(u, v)$

1. Obtain $M_{\text{degs}} = \{d_1, d_2, \cdots, d_k\}$ from ComputeMinMultDegs for $D$, $\alpha$, and $\epsilon$
2. $p_1 \leftarrow \text{MinimaxFunc}(1 - \epsilon, 1; d_1)$
3. $\tau_1 \leftarrow \text{MinimaxErr}(1 - \epsilon, 1; d_1) + \eta$
4. for $i \leftarrow 2$ to $k$ do
5.     $p_i \leftarrow \text{MinimaxFunc}(1 - \tau_{i-1}, 1 + \tau_{i-1}; d_i)$
6.     $\tau_i \leftarrow \text{MinimaxErr}(1 - \tau_{i-1}, 1 + \tau_{i-1}; d_i) + \eta$
7. end
8. return $\frac{p_k \circ p_{k-1} \circ \cdots \circ p_1(u-v) + 1}{2}$ Fig. 3. The minimum number of non-scalar multiplications of minimax composite polynomials for homomorphic comparison operation according to depth consumption $D$.

ELECTRONIC APPARATUS, CONTROL METHOD THEREOF AND SERVER

CROSS-REFERENCE TO RELATED APPLICATIONS

This application is a U.S. non-provisional application claiming priority to Korean patent application no. 10-2020-0149677 filed on Nov. 10, 2020, the content of which is incorporated by reference in its entirety.

BACKGROUND

1. Field

This disclosure relates to an electronic apparatus and a control method thereof and, more particularly, to an electronic apparatus for performing operation related to a fully homomorphic encryption, a control method, and a server.

2. Description of Related Art

Recently, while the need for personal information protection is improved, a fully homomorphic encryption is being developed as a next generation encryption. In particular, the fully homomorphic encryption technology gains an attention in a financial and medical field which are closely related to a personal information protection issue.

The fully homomorphic encryption may solve a problem of information leakage according to decryption of a related art by enabling addition and multiplication operations in an encrypted state. Since the comparison operation is used in various applications including deep learning, it is very important to perform the comparison operation by the fully homomorphic encryption. In order to perform a comparison operation in a state of being encrypted of a fully homomorphic encryption, a method of operating a polynomial may be used by finding a polynomial that best approximates a sign function.

However, in the related art, there is a limit in the polynomial itself, which approximates the sign function, and thus it is necessary to better approximate the sign function.

In addition, the comparison operation in the homomorphic encryption requires a significant non-scalar multiplication and a depth consumption, and thus it is necessary to improve the comparison operation speed in consideration of the same.

SUMMARY

The disclosure provides an electronic apparatus for more efficiently processing a comparison operation of a fully homomorphic encryption, a controlling method thereof, and a server.

According to an embodiment, an electronic apparatus includes a memory storing a composite function in which at least two polynomials are composed and a processor configured to, based on a comparison operation command being received for a plurality of homomorphic ciphertexts, perform operation by reflecting the plurality of homomorphic ciphertexts to the composite function, and obtain a comparison result of the plurality of homomorphic ciphertexts based on the operation result, each of the at least two polynomials may output a value in a preset range for a value in a preset domain, and a domain of one of the at least two polynomials may be determined based on a range of a previous polynomial.

The memory may store a first polynomial and a second polynomial forming the composite function, and the processor may obtain a first operation result by reflecting the plurality of homomorphic ciphertexts to the first polynomial, obtain a second operation result by reflecting the first operation result to the second polynomial, and obtain a comparison result of the plurality of homomorphic ciphertexts based on the second operation result, the first polynomial may output a value in a first range for a value within a first domain, the second polynomial may output a value in a second range for a value in a second domain, and the second domain may be determined based on the first range.

The first polynomial may be a minimax polynomial obtained through minimax approximation for an sgn function based on the first domain, and the second polynomial may be a minimax polynomial obtained through minimax approximation for the sgn function based on the second domain.

A scope of the second range may have a scope smaller than the first range.

The second domain may be in a scope identical with the first range or may be in a scope where a preset margin value is added to the first range.

Each of the at least two polynomials may be obtained based on one of a number of non-scalar multiplication or depth consumption.

The plurality of homomorphic ciphertexts may include a first homomorphic ciphertext and a second homomorphic ciphertext, and the processor may, based on the operation result being greater than 0, identify that the first homomorphic ciphertext is greater than the second homomorphic ciphertext, based on the operation result being smaller than 0, identify that the second homomorphic ciphertext is greater than the first homomorphic ciphertext, and based on the operation result being 0, identify that the first homomorphic ciphertext is identical with the second homomorphic ciphertext.

The processor may perform one of a maximum value operation, a minimum value operation, and an activation function operation through the operation as claim 1.

A server obtaining a composite function performing a comparison operation for a plurality of homomorphic ciphertexts includes a memory storing information about a first domain and precision and a processor configured to obtain a first polynomial based on the first domain and the precision, identify a first range indicating a scope of an output value of the first polynomial for a value within the first domain, obtain a second domain based on the first range, obtain a second polynomial based on the second domain, and obtain the composite function by composing the first polynomial and the second polynomial.

The processor may obtain a minimax polynomial obtained through minimax approximation for an sgn function as the first polynomial based on the first domain, and obtain a minimax polynomial obtained through minimax approximation for an sgn function as the second polynomial based on the second domain.

A second range indicating a scope of an output value of the second polynomial for a value within the second domain may have a scope smaller than the first range.

The processor may identify the scope of the first range as the second domain, and identify the second polynomial based on the second domain.

The processor may identify a number of non-scalar multiplication and depth consumption by degrees of a polynomial based on a preset algorithm, and obtain the first polynomial and the second polynomial based on at least one of the number of non-scalar multiplication and the depth consumption.

The processor may, based on receiving a user command to designate one value between the non-scalar multiplication or depth by degrees of a polynomial, obtain each of the first polynomial and the second polynomial based on an option to optimize other one of the non-scalar multiplication and the depth with respect to the received user command.

A method of controlling an electronic apparatus according to an embodiment includes receiving a comparison operation command for a plurality of homomorphic ciphertexts, performing operation by reflecting the plurality of homomorphic ciphertexts to a composite function in which at least two polynomials are composed, and obtaining a comparison result of the plurality of homomorphic ciphertexts based on the operation result, each of the at least two polynomials may output a value in a preset range for a value in a preset domain, and a domain of one of the at least two polynomials may be determined based on a range of a previous polynomial.

The operating may include obtaining a first operation result by reflecting the plurality of homomorphic ciphertexts to a first polynomial forming the composite function and obtaining a second operation result by reflecting the first operation result to the second polynomial forming the composite function, the obtaining may include obtaining a comparison result of the plurality of homomorphic ciphertexts based on the second operation result, the first polynomial may output a value in a first range for a value within a first domain, the second polynomial may output a value in a second range for a value in a second domain, and the second domain may be determined based on the first range.

The first polynomial may be a minimax polynomial obtained through minimax approximation for an sgn function based on the first domain, and the second polynomial may be a minimax polynomial obtained through minimax approximation for the sgn function based on the second domain.

The plurality of homomorphic ciphertexts may include a first homomorphic ciphertext and a second homomorphic ciphertext, and the obtaining may include, based on the operation result being greater than 0, identifying that the first homomorphic ciphertext is greater than the second homomorphic ciphertext, based on the operation result being smaller than 0, identifying that the second homomorphic ciphertext is greater than the first homomorphic ciphertext, and based on the operation result being 0, identifying that the first homomorphic ciphertext is identical with the second homomorphic ciphertext.

The second range may have a scope smaller than the first range.

The second domain may be in a scope identical with the first range or is in a scope where a preset margin value is added to the first range.

According to various embodiments as described above, the electronic apparatus may process a comparison operation of a fully homomorphic encryption more efficiently by performing a comparison operation of the fully homomorphic encryption using a composite function including a plurality of polynomials which is related to an input and output scope between consecutive polynomials.

The electronic apparatus may reduce an operation time by performing a comparison operation by using a composite function to minimize at least one of a number of non-scalar multiplication or depth consumption.

BRIEF DESCRIPTION OF THE DRAWINGS

FIGS. 4A to 7B are diagrams illustrating a method of obtaining approximate polynomial of a sign function according to an embodiment of the disclosure;

FIGS. 8A to 9 are diagrams illustrating an effect of the disclosure;

FIGS. 11 and 12 are diagrams illustrating various expanded embodiments of the disclosure;

FIG. 13 is a diagram illustrating a method for using a margin value according to an embodiment of the disclosure;

DETAILED DESCRIPTION

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The expression "At least one of A or/and B" should be understood to represent "A" or "B" or any one of "A and B."

As used herein, terms such as "first," and "second," may identify corresponding components, regardless of order and/or importance, and are used to distinguish a component from another without limiting the components.

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

In this disclosure, a term user may refer to a person using an electronic apparatus or an apparatus (for example: artificial intelligence (AI) electronic apparatus) that uses an electronic apparatus.

Hereinafter, embodiments of the disclosure will be described in detail with reference to the accompanying drawings.

Figure 1:
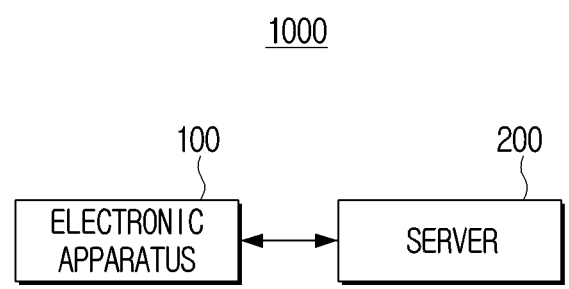
FIG. 1 is a diagram illustrating an electronic system according to an embodiment of the disclosure.

FIG. 1 is a diagram illustrating an electronic system 1000 according to an embodiment of the disclosure. The electronic system 1000 includes an electronic apparatus 100 and a server 200 as illustrated in FIG. 1.

The electronic apparatus 100 is an apparatus to perform comparison operation of homomorphic encryption and may be implemented as a device such as a desktop personal computer (PC), a notebook computer, a television (TV), a smart phone, a tablet PC, a wearable device, or the like. The embodiment is not limited thereto, and the electronic apparatus 100 may be any device capable of performing a comparison operation of homomorphic encryption.

The electronic apparatus 100 may perform a comparison operation for a plurality of homomorphic ciphertexts based on a composite function received from the server 200.

The server 200 may be a device that obtains a composite function for performing a comparison operation of a homomorphic encryption. The embodiment is not limited thereto and the server 200 may be implemented as a device such as a desktop PC, a notebook computer, a TV, a smart phone, a tablet PC, a wearable device, or the like, or any device capable of obtaining a composite function for performing a comparison operation of the homomorphic encryption.

The server 200 may obtain a composite function in consideration of an input/output range between consecutive polynomial among a plurality of polynomial included in a composite function. For example, the server 200 may obtain a first polynomial based on a first domain, identify a first range indicating a range of an output value of the first polynomial for a value in the first domain, obtain a second domain based on the first range, obtain a second polynomial based on the second domain, and compose the first polynomial and the second polynomial to obtain a composite function. Here, the domain represents the range of the input value, and the range represents the range of the output value.

The server 200 may provide the obtained composite function to the electronic apparatus 100.

For convenience of description, the electronic apparatus 100 and the server 200 are separately illustrated in FIG. 1, but the embodiment is not limited thereto. For example, the electronic apparatus 100 and the server 200 may be implemented as a single device.

Figure 2:
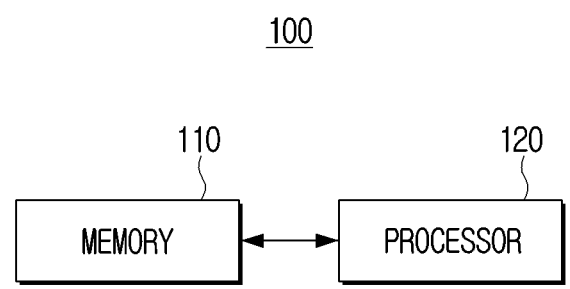
FIG. 2 is a block diagram illustrating a configuration of an electronic apparatus according to an embodiment of the disclosure.

FIG. 2 is a block diagram illustrating a configuration of the electronic apparatus 100 according to an embodiment. Referring to FIG. 2, the electronic apparatus 100 includes a memory 110 and a processor 120.

The memory 110 may refer to a hardware that stores information such as data as an electric or magnetic form so that the processor 120, or the like, may access, and the memory 110 may be implemented as at least one hardware among a non-volatile memory, a volatile memory, a flash memory, a hard disk drive (HDD) or solid state drive (SSD), random access memory (RAM), read-only memory (ROM), or the like.

The memory 110 may store at least one instruction, program, or data used for operation of the electronic apparatus 100 or the processor 120. The instruction is a code unit that directs the operation of the electronic apparatus 100 or the processor 120, and may be written in a machine language that can be understood by a computer. A module may be an instruction set of a series of instructions that perform a particular task of a task unit.

Data, which may represent characters, numbers, images, etc., may be stored in the memory 110 in a unit of byte of bit. For example, the memory 110 may store a composite function in which at least two polynomial coefficients are composed.

The memory 110 may be accessed by the processor 120, and reading/writing/modifying/updating of data by the processor 120 may be performed associated with the instructions, modules, or data.

The processor 120 may control overall operations of the electronic apparatus 100.

The processor 120 may be connected to each configuration of the electronic apparatus 100 to control overall operations of the electronic apparatus 100. For example, the processor 120 may be connected to the memory 110, a communication interface (not shown), or the like, for controlling the operation of the electronic apparatus 100.

The processor 120 according to an embodiment may be implemented as a digital signal processor (DSP), a microprocessor, a time controller (TCON). However, the embodiment is not limited thereto, and may include, for example, and without limitation, one or more from among a central processing unit (CPU), a micro controller unit (MCU), a micro processing unit (MPU), a controller, an application processor (AP), a communication processor (CP), an ARM processor, or the like, or may be defined by the corresponding term. In addition, the processor 120 may be implemented as a System on Chip (SoC) or large scale integration (LSI) embedded with a processing algorithm, and may be implemented in the form of a field programmable gate array (FPGA).

The processor 1210 may, based on receiving a comparison operation command for a plurality of homomorphic ciphertexts, perform operation by reflecting the plurality of homomorphic ciphertexts to a composite function, and obtain a comparison result of the plurality of homomorphic ciphertexts based on the operation result. Each of the at least two polynomials may output a value in a preset range for a value in a preset domain, and a domain of one of the at least two polynomials may be determined based on a range of a previous polynomial.

The memory 110 may store a first polynomial and a second polynomial forming the composite function and obtain a first operation result by reflecting the plurality of homomorphic ciphertexts to the first polynomial, obtain a second operation result by reflecting the first operation result to the second polynomial, and obtain a comparison result of the plurality of homomorphic ciphertexts based on the second operation result.

The first polynomial may output a value in a first range for a value within a first domain, the second polynomial may output a value in a second range for a value in a second domain, and the second domain may be determined based on the first range.

The first polynomial may be a minimax polynomial obtained through minimax approximation for an sgn function based on the first domain, and the second polynomial may be a minimax polynomial obtained through minimax approximation for the sgn function based on the second domain.

The second range may have a scope smaller than the first range.

The second domain may have the same range as the first range. Alternatively, the second domain may have a larger range than the first range by a predetermined value. For example, if the first range is in the range of 3, the second domain may be in the range of 5, or may be variously set. The second domain may be determined as a scope where a preset margin value is added to the first range.

Each of at least two polynomials may be obtained based on one of the number of non-scalar multiplication and the depth consumption.

The plurality of homomorphic ciphertexts may include a first homomorphic ciphertext and a second homomorphic ciphertext, and the processor 120 may identify, based on the operation result being greater than 0, identify that the first homomorphic ciphertext is greater than the second homomorphic ciphertext, based on the operation result being smaller than 0, identifying that the second homomorphic ciphertext is greater than the first homomorphic ciphertext, and based on the operation result being 0, identify that the first homomorphic ciphertext is identical with the second homomorphic ciphertext.

Referring to FIG. 2, it is described that the composite function includes the first polynomial and the second polynomial, but the embodiment is not limited thereto. For example, in a composite function, three or more polynomials may be composed. For example, the composite function may include the first polynomial, the second polynomial, and the third polynomial, the second domain of the second polynomial may be determined based on the first range of the first polynomial, and the third domain of the third polynomial may be determined based on the second range of the second polynomial.

The embodiment is not limited thereto and input/output range of all pairs of consecutive polynomials may not be related thereto. For example, if the composite function includes the first polynomial, the second polynomial and the third polynomial, the second domain of the second polynomial may be determined based on the first range of the first polynomial, but the third domain of the third polynomial may be different from the second range of the second polynomial. If only one or more pair of consecutive polynomials, among the plurality of polynomials included in the composite function, are related to the input/output range, it is fine, and the input/output range of all pairs of consecutive polynomials needs not to be related.

FIG. 2 merely describes comparative operation, but the embodiment is not limited thereto. For example, the processor 120 may perform at least one of a maximum value operation, a minimum value operation, or an activation function operation.

Figure 3:
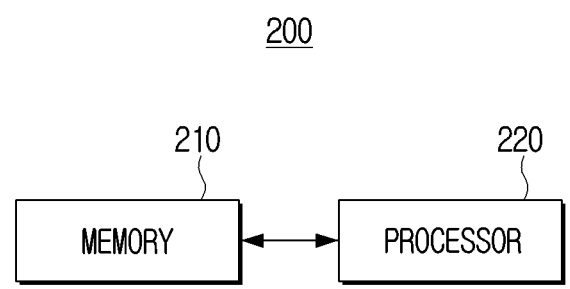
FIG. 3 is a block diagram illustrating a configuration of a server according to an embodiment of the disclosure.

FIG. 3 is a block diagram illustrating a configuration of a server 200 according to an embodiment. The server 200 includes a memory 210 and a processor 220, as shown in FIG. 3. The memory 210 and the processor 220 of FIG. 3 may be implemented in the same manner as the memory 110 and the processor 120 of FIG. 2, respectively, and a description thereof will be omitted.

Information about the first domain and the precision may be stored in the memory 210. For example, the server 200 may store information about the first domain and the precision received from the user in the memory 210.

In the memory 210, a method of calculating a polynomial approximating a sign function may be stored. For example, the memory 210 may be stored with a minimax approximation scheme. The embodiment is not limited thereto, and a variety of polynomial calculation methods may be stored, and any method may be used if the sign function may be approximated.

The processor 220 generally controls the operation of the server 200. The processor 220 may be connected to each configuration of the server 200 to generally control the operation of the server 200. For example, the processor 220 may be connected to a configuration such as the memory 210, a communication interface (not shown), and the like, to control the operation of the server 200.

The processor 220 may obtain a first polynomial based on the first domain, identify a first range indicating a scope of an output value of the first polynomial for a value within the first domain, obtain a second domain based on the first range, obtain a second polynomial based on the second domain, and obtain the composite function by composing the first polynomial and the second polynomial.

The processor 220 may obtain the minimax polynomial obtained through the minimax approximation for an sgn function as the first polynomial based on the first domain, and may obtain the minimax polynomial obtained through the minimax approximation for the sgn function as the second polynomial based on the second domain.

The second range indicating the range of the output value of the second polynomial for the value in the second domain may be smaller than the first range.

The processor 220 may identify the range of the first range as the second domain, and may obtain the second polynomial based on the second domain.

Referring to FIG. 3, it is described that the composite function includes the first polynomial and the second polynomial, but is not limited thereto. For example, the processor 220 may synthesize three or more polynomials. In the above example, the processor 220 may obtain a second polynomial, and then may identify a second range indicating a range of an output value of a second polynomial for a value in the second domain of the second polynomial, obtain a third domain based on the second range, obtain a third polynomial based on the third domain, and synthesize the first polynomial, the second polynomial, and the third polynomial to obtain a composite function.

The embodiment is not limited thereto, and the processor 220 may obtain a third polynomial independently of the second range of the second polynomial after obtaining the second polynomial, and may synthesize the first polynomial, the second polynomial, and the third polynomial to obtain a composite function.

As described above, the server 200 may obtain a continuous polynomial related to the input/output range to obtain a composite function, and the electronic apparatus 100 may more efficiently process a comparison operation of the fully homomorphic encryption by performing a comparison operation of the fully homomorphic encryption using a composite function.

A method of obtaining composite function will be described in greater detail through the drawings.

FIGS. 4A to 7B are diagrams illustrating a method of obtaining approximate polynomial of a sign function according to an embodiment of the disclosure.

Figure 4A:
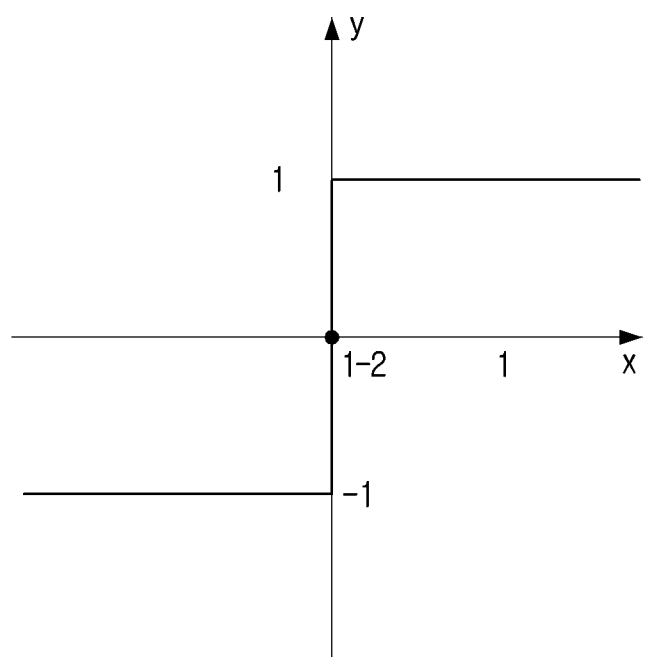

FIG. 4A illustrates the sign function (sgn), where y is 1 if x is greater than 0, y is 0 if x is 0, and y is −1 if x is less than 0. The difference between the two inputs may be input to the sign function and the size of the two inputs may be compared based on the output.

The server 200 may obtain an approximate polynomial approximating the sign function, and the accuracy of the operation may be improved according to how the approximate polynomial approaches the sign function. The accuracy of the operation may be further improved as the plurality of approximate polynomials are composed.

Figure 4B:
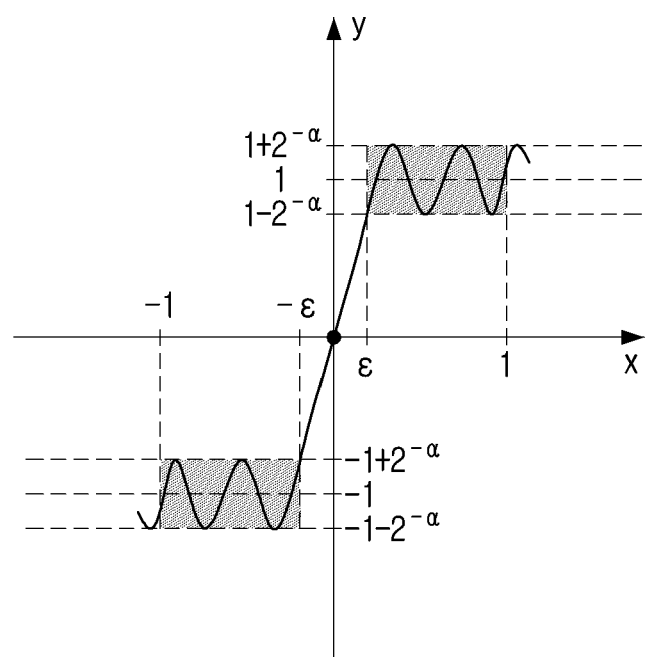

In order to describe a method of obtaining approximate polynomial, a condition such as Equation 1 is assumed. When an arbitrary polynomial p satisfies Equation 1, it is considered that p is ($\alpha,\varepsilon$)-close to the sign function in $[-1,1]$. Here, $\|\cdot\|_{\infty,D}$ refers to the infinity norm of the interval D. According to an embodiment, approximate function may be obtained with $\varepsilon=2^{-\alpha}$. Here, alpha $\alpha$ is a positive real value corresponding to the precision of the comparison operation, and the greater the $\alpha$, the higher the precision. As illustrated in FIG. 4B, outputting a value by the approximate function within a shaded portion in the interval D is a condition.

$$\|p(x)-\text{sgn}(x)\|_{\infty,[-1,-\varepsilon]\cup[\varepsilon,1]}\leq 2^{-\alpha} \qquad \text{[Equation 1]}$$

The processor 220 may obtain minimax polynomial (approximate polynomial) through the minimax approximation. Here, the minimax approximate polynomial may be an approximate polynomial, among the polynomials with n or less degree for any piece-wise continuous function, having a maximum error $\max_D \|f(x)-p(x)\|_\infty$ to be minimum.

The processor 220 may set a domain of the next minimax polynomial based on the range of the minimax polynomial. For example, the processor 220 may set the range of the minimax polynomial and the domain of the next minimax polynomial in the same manner. Alternatively, the processor 220 may enlarge the domain of the next minimax polynomial with a predetermined ratio than the range of the minimax polynomial.

The processor 220 may obtain the next minimax polynomial in the same manner.

The processor 220 may obtain a plurality of minimax polynomials by repeating the above-described method, and synthesize a plurality of minimax polynomials to obtain a composite function.

The processor 220 may obtain minimax polynomials composed of odd degree terms.

The processor 220 may obtain composite function based on at least one of the number of non-scalar multiplication and the depth consumption.

For convenience of description, it is assumed that F (a,b;d) represents the minimax approximate polynomial of the maximum degree d approximating the sign function in the period $[-b,-a]\cup[a,b]$, and E (a,b;d) represents the minimax approximation error of the maximum approximate polynomial with the maximum degree d approximating the sign function in the interval $[-b,-a]\cup[a,b]$. The number of non-scalar multiplication (mult(d)) and depth consumption (dep(d)) which are necessary for the polynomial calculation with the degree d may use a predetermined algorithm as illustrated in FIG. 5. For example, a predetermined algorithm may be a Paterson-Stockmeyer algorithm, but it is not limited thereto, and a variety of operating algorithms may be used. For example, a method of fixing a polynomial operation algorithm and finding a polynomial that minimizes non-scalar multiplication and depth may be used based thereon.

The minimax composition may be defined as shown below. When functions f1, f2, . . . , fk may have odd degree terms, and there are $\sigma 1, \ldots, \sigma k$ and d1, . . . , dk which satisfy the following, $$f_k \circ f_{k-1} \circ \cdots \circ f_1$$

may be called minimax composition.

i) f1 is minimax approximate polynomial having maximum degree d1 for sgn(x) in the interval $[-1,-\varepsilon]\cup[\varepsilon,1]$, and the minimax approximation error is $\sigma 1$.

ii) For $2\leq i\leq k$, fi is minimax approximate polynomial with the maximum degree d1 for sgn(x) in the interval $[-1-\sigma i-1, -1+\sigma i-1]\cup[1-\sigma i-1, 1+\sigma i-1]$, and the minimax approximation error is $\sigma i$.

The processor 220 may obtain an optimal minimax composite polynomial that requires least non-scalar multiplication and depth consumption while satisfying error condition ($\alpha-1,\varepsilon$)-close, during which all minimax compositions are searched.

There are significant operation amounts to obtain the minimax composite polynomial and thus, there is necessity to reduce operation amount and the following is defined.

For the natural number d, MinErr(d,t) is defined as the minimax approximation error of the minimax approximate polynomial of maximum degree d approximating sgn(x) in the interval $[-1-t,-1+t]\cup[1-t,1+t]$, InvMinErr(d,t) is defined as $\pi$ satisfying MinErr(d,$\sigma$)=t for natural number 3, and $$\text{MultiNum}(\{f_i\}_{1\leq i\leq k}), \text{DepNum}(\{f_i\}_{1\leq i\leq k})$$

are defined as shown below.

$$\text{MultiNum}(\{f_i\}_{1\leq i\leq k}) = \sum_{i=1}^{k} \text{mult}(\deg(f_i))$$

$$\text{DepNum}(\{f_i\}_{1\leq i\leq k}) = \sum_{i=1}^{k} \text{dep}(\deg(f_i))$$

Here, f(m, n, t) is defined as the largest value among $\sigma$ in which a minimax composition $$f_k \circ f_{k-1} \circ \cdots \circ f_1$$

satisfying $$f_k \circ f_{k-1} \circ \cdots \circ f_1([1-\tau, 1+\tau]) \subseteq [1-t, 1+t],$$

$$\text{MultiNum}(\{f_i\}_{1\leq i\leq k}) \leq m, \text{DepNum}(\{f_i\}_{1\leq i\leq k}) \leq n$$

is present. That is, f (m, n, t) refers to the largest value of $\sigma$ where the error $\sigma$ from 1 may decrease to error t from 1, with m or less non-scalar multiplication and n or less depth consumption.

G (m, n, t) is an ordered set, which stores the degrees of the polynomials of the corresponding minimax composition from the definition of f (m, n, t), where a recursive equation may be established for f (m, n, t):

$$f(m, n, t) = \max_{1\leq k, \text{mult}(2k+1)\leq m, \text{dep}(2k+1)\leq n}$$
$$\text{InvMinErr}(2k+1, f(m-\text{mult}(2k+1), n-\text{dep}(2k+1), t))$$

Under the assumption as shown above, the processor 220 may obtain f (m, n, t) and G (m, n, t) for all m and n through the algorithm shown in FIG. 6. In particular, the processor 220 may obtain a minimax approximate polynomial of less than or equal to $31^{st}$ degrees to reduce the amount of operation.

The processor 220 may obtain a minimax composite polynomial that requires the smallest non-scalar multiplication and depth consumption while satisfying the error conditions ($\alpha-1,\varepsilon$)-close based on f (m, n, t) and G (m, n, t).

As illustrated in FIG. 7A, the processor 220 may obtain the minimax composite polynomial based on the DynMinMult algorithm. The DynMinMult algorithm has a priority to reduce non-scalar multiplication rather than the depth consumption. The DynMinMult algorithm is purposed to minimize the depth consumption while minimizing the number of non-scalar multiplication. The minmult represents the minimum value of the number of non-scalar multiplication, and mindep represents the minimum value of the depth consumption when the number of non-scalar multiplication is to be minimum.

The processor 220, as shown in FIG. 7B, may obtain a minimax composite polynomial based on the DynMinDep algorithm. The DynMinDep algorithm preferentially reduces the depth consumption rather than the non-scalar multiplication. It is an object of the DynMinDep algorithm to minimize a non-scalar multiplication while minimizing the depth consumption. The minimum value of the MINDEP is the minimum value of the depth constraint, and the mindep represents the minimum value of the non-scalar multiplication, and the minmult represents the minimum value of the non-scalar multiplication when the depth consumption is minimized.

For both algorithms, mindegs is an ordered set that stores the degree of the configuration minimax approximate polynomials corresponding to the optimal composite polynomial, and with the known mindegs, the optimal composite polynomials that approximate sign function may be obtained by sequentially obtaining the corresponding configuration minimax approximate polynomials through the modified Remez algorithm. To be specific, for mindegs={$d_1, d_2, \ldots, d_K$}, f1 represents the minimax approximate polynomial with the maximum degree dl for sgn(x) in the interval $[-1,-\varepsilon]\cup[\varepsilon,1]$, minimax approximation error may be $\sigma$1, and the approximate polynomials thereafter may be defined in a recursive manner. For $2 \leq i \leq k$, fi represents the minimax approximate polynomial with the maximum degree dl for sgn (x) in the interval $[-1-\sigma i-1,-1+\sigma i-1]\cup[1-\sigma i-1,1+\sigma i-1]$, and the minimax approximation error is $\sigma$i. As described above, the processor 220 may obtain an optimal minimax composition approximating the sign function based on mindegs.

FIGS. 8A to 9 are diagrams illustrating an effect of the disclosure.

In the homomorphic encryption, there is a need for a large amount of time to perform a non-scalar multiplication operation, and a significant amount of time is required to perform bootstrapping when the depth consumption exceeds a predetermined value. Therefore, in the case of using a composite function that uses less number of non-scalar multiplication and the depth consumption as described above, the time of the comparison operation may be reduced.

FIG. 8A sets a priority to reduce the number of non-scalar multiplication. As illustrated in FIG. 8A, the number of non-scalar multiplication and the depth consumption have decreased by about 33%, 35%, respectively, as compared to the related art.

FIG. 8B is a diagram illustrating that priority is set to the reduction of depth consumption. As shown in FIG. 8B, the number of non-scalar multiplication and the depth consumption have decreased by about 10% and 47%, respectively as compared to the related art.

FIG. 9 illustrates an ordered set of degrees of the optimal composite function in the DynMinDep algorithm, and the DynMinMult algorithm according to an embodiment of the disclosure.

Figure 10:
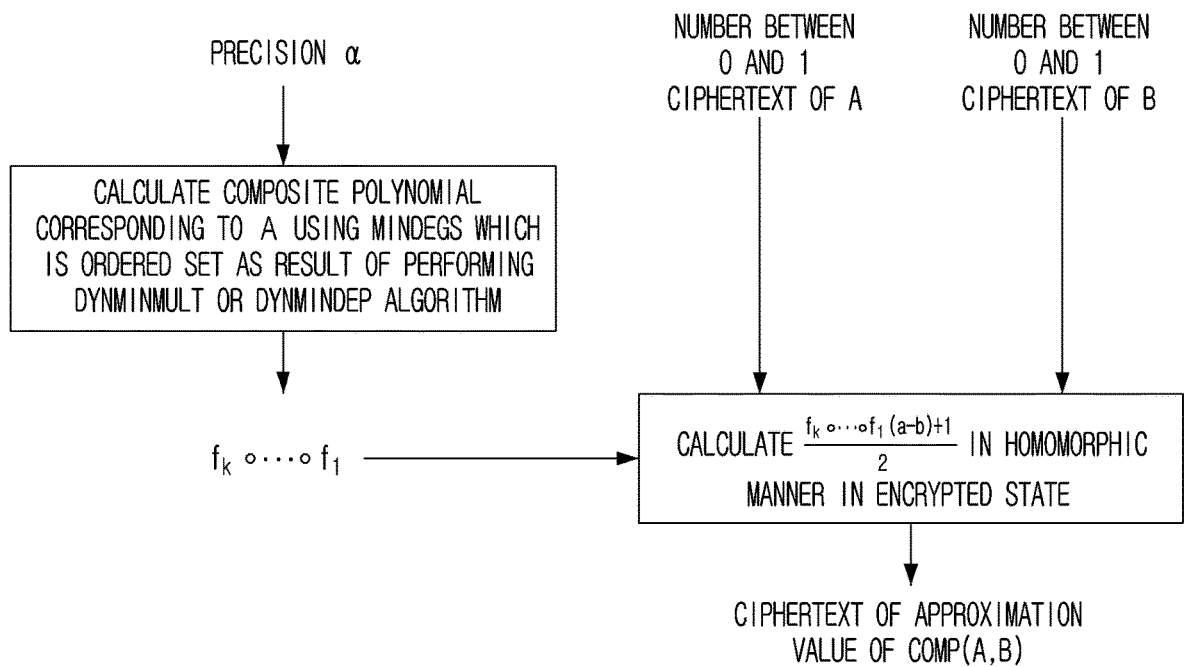
FIG. 10 is a diagram illustrating a method for performing a comparison operation in an encrypted state according to an embodiment of the disclosure.

FIG. 10 is a diagram illustrating a method for performing a comparison operation in an encrypted state according to an embodiment of the disclosure.

As illustrated in FIGS. 4A to 7B, the processor 220 of the server 200 may obtain $$f_k \circ f_{k-1} \circ \cdots \circ f_1$$

which is the composite polynomial for the precision $\alpha$.

The processor 220 may obtain the mindegs ordered set based on a of FIG. 9. For example, when the number of the non-scalar multiplication is to be minimized, the processor 220 may obtain the mindegs ordered set corresponding to the DynMinMult, and when the depth consumption is to be minimized, may obtain the mindegs ordered set corresponding to the DynMinDep. For example, if mindegs={d1, d2, . . . , dk}, f1 represents the minimax approximate polynomial with the maximum degree dl for sgn(x) in the interval $[-1,-\varepsilon]\cup[\varepsilon,1]$, minimax approximation error is al, and as for $2 \leq i \leq k$, fi represents the minimax approximate polynomial with the maximum degree dl for sgn(x) in the interval $[-1-\sigma i-1,-1+\sigma i-1]\cup[1-\sigma i-1,1+\sigma i-1]$, and the minimax approximation error is $\sigma$i. In this manner, the processor 220 may obtain the optimal minimax composition that approximates the sign function based on the mindegs.

The processor 120 of the electronic apparatus 100 may perform a comparison operation of two numbers a and b between 0 and 1 in an encryption state. If two numbers a and b are not between 0 and 1, the processor 120 may scale two numbers a and b between 0 and 1 and may perform a comparison operation of the scaled two numbers a and b.

The processor 120 may perform comparison operation for two numbers a and b based on $$f_k \circ f_{k-1} \circ \cdots \circ f_1.$$

The processor 120 may, through $$\frac{f_k \circ \cdots \circ f_1(a-b)+1}{2},$$

obtain ciphertext for precision $\alpha$ and decrypt the obtained ciphertext to obtain a comparison result.

Referring to FIG. 10, the electronic apparatus 100 and the server 200 are illustrated separately, but the embodiment is not limited thereto. For example, the electronic apparatus 100 may serve as the server 200. In this example, when information on precision, or the like, is received, the electronic apparatus 100 may obtain a composite function based on the received information and may perform a comparison operation through the obtained composite function.

In addition, the processor 120 may perform a maximum value operation, a minimum value operation, and an activation function operation through a method as shown in FIG. 10. For example, if the synthetic polynomial is p (x), the processor 120 may use the approximate polynomial as follows to perform the maximum value operation max (a, b).

$$\frac{a+b+(a-b)p(a-b)}{2}$$

The processor 120 may use the relation such as min(a,b) =a+b−max(a,b) to perform the minimum value operation (min(a,b)).

The activation function operation may include ReLU(x) operation, Binary step (Unit Step) operation, Parametric Rectified Linear Unit(PReLU) operation, Leaky ReLU operation, sign operation, Piece-wise linear operation, or the like.

For example, the processor 120 may use the approximate polynomial as shown below to perform ReLU(x) operation among activation function operations.

$$\frac{x(1+p(x))}{2}$$

In this example, the ReLU(x) may be approximated only in the range of [−1,1].

The processor 120 may use the approximate polynomial to approximate the ReLU(x) in the [−K,K] range for K>0.

$$\frac{x(1+p(x/K))}{2}$$

The processor 120 may approximate an activation function through a similar method. The processor 120 may perform operations such as FIGS. 11 and 12 in the manner described above.

FIG. 13 is a diagram illustrating a method for using a margin value according to an embodiment of the disclosure.

As shown in FIG. 13, when the minimax approximate polynomial for the i-1th domain is obtained, a domain of an ih function may be set by adding a predetermined margin value to the range. For example, if the range of the i−1$^{th}$ function is $[1-\tau_{i-1}, 1+T_{i-1}]$, the next function may be $[1-\tau_{i-1}-\eta, 1+\tau_{i-1}+\eta]$. Through this operation, even if an error such as being out of the range expected in the calculation process of the previous function occurs, the domain of the next function may be entered.

Figure 14:
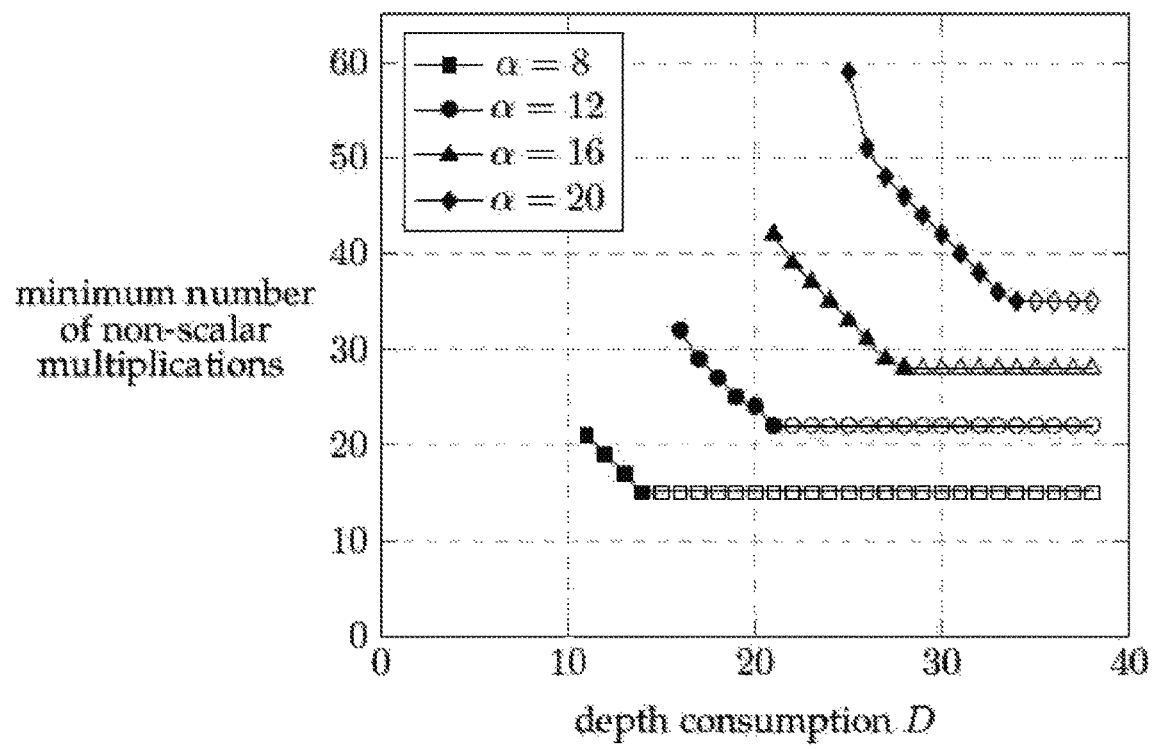
FIG. 14 is a diagram illustrating a method of using a tradeoff according to an embodiment of the disclosure.

FIG. 14 is a diagram illustrating a method of using a tradeoff according to an embodiment of the disclosure.

The above-described method of using the depth minimum or non-scalar multiplication minimum is described above, but the embodiment is not limited thereto.

For example, tradeoff between the non-scalar multiplication and depths may be used.

The processor 220 may, based on receiving a user command to designate one value between the non-scalar multiplication or depth by degrees of a polynomial, obtain each of the first polynomial and the second polynomial based on an option to optimize other one of the non-scalar multiplication and the depth with respect to the received user command.

For example, if a user command for the depth is input, an option that consumes the smallest non-scalar multiplication for the depth corresponding to the user command may be used.

Figure 15:
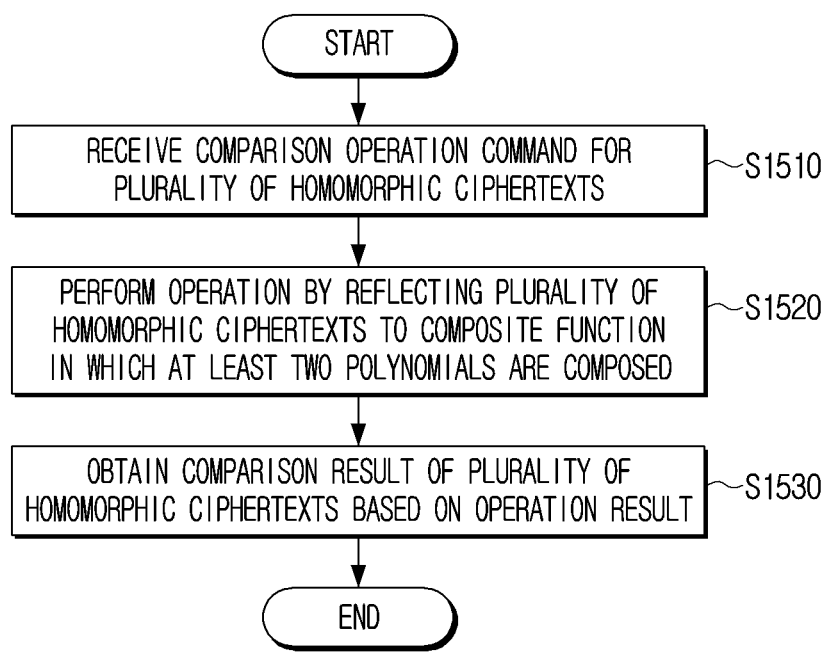
FIG. 15 is a flowchart illustrating a controlling method of an electronic apparatus according to an embodiment of the disclosure.

FIG. 15 is a flowchart illustrating a controlling method of an electronic apparatus according to an embodiment of the disclosure.

A comparison operation command for a plurality of homomorphic ciphertexts is received in operation S1510. Operation is performed by reflecting the plurality of homomorphic ciphertexts to a composite function where at least two polynomials are composed in operation S1520. A comparison result of the plurality of homomorphic ciphertexts is obtained based on the operation result in operation S1530. Each of the at least two polynomials may output a value in a preset range for a value in a preset domain, and a domain of one of the at least two polynomials may be determined based on a range of a previous polynomial.

The operating in operation S1520 may include obtaining a first operation result by reflecting the plurality of homomorphic ciphertexts to the first polynomial forming the composite function, obtaining a second operation result by reflecting the first operation result to the second polynomial forming the composition function, and the obtaining in operation S1530 may include obtaining a comparison result of the plurality of homomorphic ciphertexts based on the second operation result, the first polynomial may output a value in a first range for a value within a first domain, the second polynomial may output a value in a second range for a value in a second domain, and the second domain may be determined based on the first range.

The first polynomial may be a minimax polynomial obtained through minimax approximation for an sgn function based on the first domain, and the second polynomial may be a minimax polynomial obtained through minimax approximation for the sgn function based on the second domain.

The plurality of homomorphic ciphertexts may include a first homomorphic ciphertext and a second homomorphic ciphertext, and the obtaining in operation S1530 may include identifying, based on the operation result being greater than 0, identifying that the first homomorphic ciphertext is greater than the second homomorphic ciphertext, based on the operation result being smaller than 0, identifying that the second homomorphic ciphertext is greater than the first homomorphic ciphertext, and based on the operation result being 0, identifying that the first homomorphic ciphertext is identical with the second homomorphic ciphertext.

The second range may have a scope smaller than the first range.

The second domain may have a range which is the same as the first range.

Each of the at least two polynomials may be obtained based on one of the number of non-scalar multiplication and the depth consumption.

According to various embodiments, the electronic apparatus may more efficiently process a comparison operation of a fully homomorphic encryption by performing a comparison operation of a fully homomorphic encryption by using a composite function including a plurality of polynomials related with an input/output range between consecutive polynomial ranges.

In particular, the electronic apparatus may reduce operation time by performing a comparison operation using a composite function that minimizes at least one of the number of non-scalar multiplication or the depth consumption.

Meanwhile, various embodiments of the disclosure may be implemented in software, including instructions stored on machine-readable storage media readable by a machine (e.g., a computer). An apparatus may call instructions from the storage medium, and execute the called instruction, including an electronic apparatus (for example, electronic apparatus A) according to the disclosed embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium.

According to an embodiment, the method according to the above-described embodiments may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online (e.g., downloaded or uploaded) directly between to users (e.g., smartphones). In the case of online distribution, at least a portion of the computer program product may be at least temporarily stored or temporarily generated in a server of the manufacturer, a server of the application store, or a machine-readable storage medium such as memory of a relay server.

The various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments such as the procedures and functions described herein may be implemented with separate software modules. Each of the software modules may perform one or more of the functions and operations described herein.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device. The non-transitory computer-readable medium does not refer to a medium that stores data for a short period of time, such as a register, cache, memory, etc., but semi-permanently stores data and is available of reading by the device. For example, the non-transitory computer-readable medium may be CD, DVD, a hard disc, Blu-ray disc, USB, a memory card, ROM, or the like.

According to the embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While example embodiments of the disclosure have been illustrated and described, the disclosure is not limited to the specific embodiments described above. It will be understood by those skilled in the art that various changes in form and details may be made therein without departing from the true spirit and full scope of the disclosure, including the appended claims and their equivalents.

This invention was supported by Samsung Research Funding Center of Samsung Electronics under Project Number SRFC-IT1801-08.

What is claimed is:

1. An electronic apparatus comprising:
a memory storing a composite function in which at least two polynomials are composed; and
a processor configured to, based on a comparison operation command being received for a plurality of homomorphic ciphertexts, perform operation by reflecting the plurality of homomorphic ciphertexts to the composite function, and obtain a comparison result of the plurality of homomorphic ciphertexts based on the operation result,
wherein each of the at least two polynomials outputs a value in a preset range for a value in a preset domain, and
wherein a domain of one of the at least two polynomials is determined based on a range of a previous polynomials;
wherein the memory stores a first polynomial and a second polynomial forming the composite function,
wherein the processor is further configured to:
obtain a first operation result by reflectinq the plurality of homomorphic ciphertexts to the first polynomial, obtain a second operation result by reflecting the first operation result to the second polynomial, and obtain a comparison result of the plurality of homomorphic ciphertexts based on the second operation result,
wherein the first polynomial outputs a value in a first range for a value within a first domain,
wherein the second polynomial outputs a value in a second range for a value in a second domain, and
wherein the second domain is determined based on the first range.

2. The electronic apparatus of claim 1, wherein the first polynomial is a minimax polynomial obtained through minimax approximation for an sgn function based on the first domain, and
wherein the second polynomial is a minimax polynomial obtained through minimax approximation for the sgn function based on the second domain.

3. The electronic apparatus of claim 1, wherein a scope of the second range has a scope smaller than the first range.

4. The electronic apparatus of claim 1, wherein the second domain is in a scope identical with the first range or is in a scope where a preset margin value is added to the first range.

5. The electronic apparatus of claim 1, wherein each of the at least two polynomials is obtained based on one of a number of non-scalar multiplication or depth consumption.

6. The electronic apparatus of claim 1, wherein the plurality of homomorphic ciphertexts comprise a first homomorphic ciphertext and a second homomorphic ciphertext,
wherein the processor is further configured to:

based on the operation result being greater than 0, identify that the first homomorphic ciphertext is greater than the second homomorphic ciphertext, based on the operation result being smaller than 0, identify that the second homomorphic ciphertext is greater than the first homomorphic ciphertext, and based on the operation result being 0, identify that the first homomorphic ciphertext is identical with the second homomorphic ciphertext.

7. The electronic apparatus of claim 1, wherein the processor is further configured to perform one of a maximum value operation, a minimum value operation, and an activation function operation through the operation as claim 1.

8. A method of controlling an electronic apparatus, the method comprising:

receiving a comparison operation command for a plurality of homomorphic ciphertexts;

performing operation by reflecting the plurality of homomorphic ciphertexts to a composite function in which at least two polynomials are composed; and obtaining a comparison result of the plurality of homomorphic ciphertexts based on the operation result, wherein each of the at least two polynomials outputs a value in a preset range for a value in a preset domain, and wherein a domain of one of the at least two polynomials is determined based on a range of a previous polynomial:

wherein the operating comprises obtaining a first operation result by reflecting the plurality of homomorphic ciphertexts to a first polynomial forming the composite function and obtaining a second operation result by reflecting the first operation result to the second polynomial forming the composite function, wherein the obtaining comprises obtaining a comparison result of the plurality of homomorphic ciphertexts based on the second operation result, wherein the first polynomial outputs a value in a first range for a value within a first domain, wherein the second polynomial outputs a value in a second range for a value in a second domain, and wherein the second domain is determined based on the first range.

9. The method of claim 8, wherein the first polynomial is a minimax polynomial obtained through minimax approximation for an sgn function based on the first domain, and wherein the second polynomial is a minimax polynomial obtained through minimax approximation for the sgn function based on the second domain.

10. The method of claim 8, wherein the plurality of homomorphic ciphertexts comprise a first homomorphic ciphertext and a second homomorphic ciphertext, and wherein the obtaining comprises:

based on the operation result being greater than 0, identifying that the first homomorphic ciphertext is greater than the second homomorphic ciphertext, based on the operation result being smaller than 0, identifying that the second homomorphic ciphertext is greater than the first homomorphic ciphertext, and based on the operation result being 0, identifying that the first homomorphic ciphertext is identical with the second homomorphic ciphertext.

11. The method of claim 8, wherein the second range has a scope smaller than the first range.

12. The method of claim 8, wherein the second domain is in a scope identical with the first range or is in a scope where a preset margin value is added to the first range.

* * * * *